US009886335B2

(12) United States Patent
Abraham et al.

(10) Patent No.: US 9,886,335 B2
(45) Date of Patent: *Feb. 6, 2018

(54) TECHNIQUES FOR VALIDATING FUNCTIONALITY OF BACKPLANE CONTROLLER CHIPS

(71) Applicant: AMERICAN MEGATRENDS, INC., Norcross, GA (US)

(72) Inventors: Shibu Abraham, Duluth, GA (US); Kayalvizhi Dhandapani, Suwanee, GA (US)

(73) Assignee: AMERICAN MEGATRENDS, INC., Norcross, GA (US)

(*) Notice: Subject to any disclaimer, the term of this patent is extended or adjusted under 35 U.S.C. 154(b) by 813 days.

This patent is subject to a terminal disclaimer.

(21) Appl. No.: 14/047,093

(22) Filed: Oct. 7, 2013

(65) Prior Publication Data
US 2015/0100298 A1 Apr. 9, 2015

(51) Int. Cl.
G06F 9/44 (2006.01)
G06F 13/10 (2006.01)
(Continued)

(52) U.S. Cl.
CPC ............. *G06F 11/00* (2013.01); *G06F 8/65* (2013.01)

(58) Field of Classification Search
CPC ........... G06F 9/44589; G06F 11/3684; G06F 11/3688; G06F 13/4291; G06F 11/00;
(Continued)

(56) References Cited

U.S. PATENT DOCUMENTS 7,350,108 B1 * 3/2008 Dean .................. G01R 31/2893
206/706
7,450,027 B1 11/2008 Overby
(Continued)

OTHER PUBLICATIONS

USB_Power_Delivery (USB Power Delivery, dated Sep. 9, 2012 downloaded from http://www.usb.org/developers/powerdelivery).*
(Continued)

*Primary Examiner* — Brian S Cook
(74) *Attorney, Agent, or Firm* — Locke Lord LLP; Tim Tingkang Xia, Esq.

(57) ABSTRACT

Present disclosure relates to a system for validating target backplane controller chips. The system includes a backplane controller chip validation board. In certain embodiments, the backplane controller chip validation board includes: (a) a program/verify/validate controller chip, (b) one or more backplane controller chip sockets for installing one or more target backplane controller chips, and (c) a backplane simulator. The program/verify/validate controller chip includes backplane controller chip firmware verification software, a USB interface, and a software storage. The backplane simulator is used to simulate functions of drives, LEDs, and other devices of a backplane for verifying all functions of target backplane controller chips. The backplane controller chip validation board is in communication with a host computer, and the host computer has a user interface, a backplane controller chip validation software, a USB interface, and a software storage to store backplane controller chip firmware.

25 Claims, 8 Drawing Sheets

(51) Int. Cl.
*G06F 11/00* (2006.01)
*G06F 9/445* (2006.01)

(58) Field of Classification Search
CPC . G06F 8/65; G01R 31/31908; G01R 31/2806; G01R 31/2834; G01R 31/2853; G01R 31/2886; G01R 31/31707; G01R 31/31713; G01R 31/31722; G01R 31/318307; G01R 31/31917
USPC ............... 379/10.01; 714/38.14; 324/757.04; 703/21
See application file for complete search history.

(56) References Cited

U.S. PATENT DOCUMENTS

| | | | |
|---|---|---|---|
| 7,613,843 B1 | 11/2009 | Dhandapani et al. | |
| 7,930,162 B1* | 4/2011 | Chan | G06F 17/5027 703/14 |
| 8,069,257 B1 | 11/2011 | Bhatia et al. | |
| 8,078,770 B1 | 12/2011 | Sivertsen | |
| 9,146,823 B2 | 9/2015 | Mondal et al. | |
| 2005/0138154 A1 | 6/2005 | Seto | |
| 2005/0289263 A1 | 12/2005 | Ramsey et al. | |
| 2006/0149881 A1 | 7/2006 | Clayton et al. | |
| 2006/0194460 A1 | 8/2006 | Chen et al. | |
| 2009/0282399 A1* | 11/2009 | Kamrowski | G06F 8/68 717/174 |
| 2012/0159029 A1 | 6/2012 | Krishnan et al. | |
| 2012/0166605 A1* | 6/2012 | Chou | G06F 11/3006 709/223 |
| 2012/0173944 A1 | 7/2012 | Pan | |
| 2012/0232869 A1 | 9/2012 | Maturana et al. | |
| 2012/0239845 A1* | 9/2012 | Dhandapani | G06F 3/0604 710/300 |
| 2013/0227538 A1* | 8/2013 | Maruyama | G06F 8/65 717/168 |

OTHER PUBLICATIONS

IPMI_Spec_2012 Intelligent Platform Management Interface dated Sep. 30, 2013 downloaded from https://en.wikipedia.org/w/index.php?title=Intelligent_Platform_Management_Interface&o....*

App_Note_2006 (Designing High Speed Backplanes Utilizing Physical Layer Test System and Advanced Deisgn System Tools, Agilent Technologies, Jan. 18, 2006).*

Webber et al. ("Event Driven Mixed Signal Modeling Techniques for System-in-Package Functional Verification", 2010, IEEE).

Lucille R. McMinn ("External Verification of Scasa System Embedded Controller Firmware", Department of the Air Force University, 2012).

AMI MG908 ("Backplane Controller With USB, SGPIO, SES, IBPI and IPMI", AMI MG9081 datasheet, 2010).

* cited by examiner

TECHNIQUES FOR VALIDATING FUNCTIONALITY OF BACKPLANE CONTROLLER CHIPS

FIELD

The present disclosure generally relates to an enclosure management controller (EMC), and more particularly to techniques for validating the functionality of backplane controller chips.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In large scale computing systems, a backplane is used to mount a number of storage drives and network communication devices, such as Disk Arrays, redundant array of independent disks (RAID) Subsystems, Small Computer System Interface (SCSI) and Fiber Channel (FC) Disk Array or Switched Disk Array Servers, and Telecommunication Equipment. A backplane controller chip installed on a backplane is used to facilitate a host computer to monitor and manage the storage and network devices installed on the backplane. The backplane controller chip provides an operator with detailed information regarding the presence and status of mass storage devices and network devices, provides facilities for generating visual indicators based upon backplane management data received from the host computer, and send the feedback from the backplane controller back to the host computer. For instance, individual light-emitting diodes ("LEDs") may be driven by a backplane for displaying information regarding the activity, failure, rebuild status, and other information for each of the mass storage devices connected to the backplane. In order to provide these indicators and other types of functionality, a backplane typically provides connections for multiple mass storage devices, such as hard disk drives. The backplane also interfaces with the backplane controller chip to communicate with the mass storage devices. A backplane also may receive and transmit backplane management data to and from the host computer. Backplane management data is any data relating to the provision of backplane management services by a backplane.

Several different physical interfaces may be utilized to deliver backplane management data between the host computer and the backplane. The most popular protocols used in the backplane management are: the SCSI Enclosure Services (or SES) utilizing the system management bus (or I$^2$C bus), and the SGPIO protocol utilizing an SGPIO interface to exchange backplane management information between the host computer and the backplane.

Conventionally, validating the functionality of a backplane controller chip requires physically install the backplane controller chip on the actual backplane controller and test its functionality through a series of tests. The tests include: (a) convert the firmware from source code to firmware binary image, (b) loading the backplane controller chip firmware binary image onto a memory portion of the backplane controller, (c) verifying the chip ID and firmware version, (d) programming the backplane controller chip with the backplane controller chip firmware binary image, (e) restarting the backplane controller, and (f) running tests for each function available to the backplane controller chip. However, this process can be very costly, tedious and time consuming. It is desirable to have a backplane controller chip validation board that has a set of backplane controller chip sockets so the backplane controller chips can be installed quickly and conveniently, as well as all associated circuits on the backplane controller chip validation board to simulate a backplane, such that the new backplane controller chips can be validated through this backplane controller chip validation board quickly.

Therefore, heretofore unaddressed needs still exist in the art to address the aforementioned deficiencies and inadequacies.

SUMMARY

In one aspect, the present disclosure relates to a system for validating functionalities of certain target backplane controller chips. In one embodiment, the system includes a backplane controller chip validation board. The backplane controller chip validation board has (a) a program/verify/validate controller chip, (b) one or more target backplane controller chip sockets, and (c) a backplane simulator. The program/verify/validate controller chip has (a) backplane controller chip firmware verification software, (b) a USB interface, (c) a memory, (d) a software storage, and (e) a backplane controller interface. The target backplane controller chip sockets are used to install the target backplane controller chips to be programmed, verified, and validated. The backplane simulator is used to simulate functions of drives, LEDs, and other devices of a backplane for validating all functions of the backplane controller chip to be validated. In certain embodiments, the backplane controller chip validation board is in communication with a host computer. The host computer has (a) a user interface, (b) backplane controller chip validation software, (c) a USB interface, (d) a software storage, and (e) a USB communication link. The user interface is used for a user to input validating commands and control data for validating functionalities of the target backplane controller chips. The software storage is used to store backplane controller chip firmware for the target backplane controller chips.

In certain embodiments, the backplane controller chip validation board is powered by the USB communication link between the USB interface of the host computer and the USB interface of the program/verify/validate controller chip of the backplane controller chip validation board. The USB interface of the program/verify/validate controller chip of the backplane controller chip validation board is configured to receive validation commands, control data, and the backplane controller chip firmware from the host computer, and the memory of the program/verify/validate controller chip of the backplane controller chip validation board is configured to store the backplane controller chip firmware.

In certain embodiments, the backplane controller chip validation board is used to perform one or more of following operations: (a) receiving validating commands, control data, and the backplane controller chip firmware from the backplane controller chip validation software of the host computer, (b) programming the received backplane controller chip firmware into the software storage of a target backplane controller chip of the target backplane controller chips, (c) validating functions of the target backplane controller chip with backplane controller chip firmware in the software storage of the target backplane controller chip, and (d)

sending validation results back to the host computer over the USB interface of the program/verify/validate controller chip of the backplane controller chip validation board.

In one embodiment, the validating commands and the control data are configured in accordance with the SES specification to instruct the target backplane controller chip to control the functions of drives, LEDs, and other devices of the backplane simulated by the backplane simulator on the backplane controller chip validation board. In another embodiment, the validating commands and the control data are configured in accordance with the SGPIO specification to instruct the target backplane controller chip to control the functions of drives, LEDs, and other devices of the backplane simulated by the backplane simulator on the backplane controller chip validation board. In yet another embodiment, the validating commands and the control data are configured in accordance with the IPMI specification to instruct the target backplane controller chip to control the functions of drives, LEDs, and other devices of the backplane simulated by the backplane simulator on the backplane controller chip validation board. The IPMI validating commands may include some extended OEM IPMI commands.

In certain embodiments, the received backplane controller chip firmware is programmed into the software storage of the target backplane controller chip validation board after the target backplane controller chip ID, firmware revision, checksum and last page of the received backplane controller chip firmware binary image are verified. The received backplane controller chip firmware binary image is programmed the software storage of the target backplane controller chip of the backplane controller chip validation board through a programming interface. The programming interface may include an I²C bus communication link, an SGPIO communication link, and an SES communication link.

In another aspect, the present disclosure relates to a computer-implemented method for validating certain target backplane controller chips. The computer-implemented method includes one or more of following operations: (a) connecting a backplane controller chip validation board to a host computer with a USB communication link, (b) installing at least one target backplane controller chip to be validated on one of backplane controller chip sockets on the backplane controller chip validation board, (c) receiving backplane controller chip firmware from the host computer, (d) programming the target backplane controller chip to be validated with the backplane controller chip firmware from the host computer, (d) configuring a backplane simulator for validating the functions of the target backplane controller chip, (e) sending validating commands and control data from the host computer to the backplane controller chip validation board to validate the functions of the target backplane controller chip, and (f) sending validation results report from the backplane controller chip validation board to the host computer.

In certain embodiments, the backplane controller chip validation board has (a) a program/verify/validate controller chip, (b) one or more target backplane controller chip sockets, and (c) a backplane simulator. The program/verify/ validate controller chip has (a) backplane controller chip firmware verification software, (b) a USB interface, (c) a memory, (d) a software storage, and (e) a backplane controller interface. The target backplane controller chip sockets are used to install the target backplane controller chips to be programmed, verified, and validated. The backplane simulator is used to simulate functions of drives, LEDs, and other devices of a backplane for validating all functions of the backplane controller chip to be validated. The host computer includes (a) a user interface, (b) backplane controller chip validation software stored in a memory, (c) a USB interface, (d) a USB communication link, and (e) a software storage used to store backplane controller chip firmware. The user interface is used by a user to input validating commands and control data for validating functionalities of the target backplane controller chips.

In certain embodiments, each of functions of the backplane controller chip is validated by performing one or more following operations: (a) receiving validating commands and control data for the functionality of the backplane controller chip from the backplane controller chip validation software of the host computer, at USB interface of the program/verify/validate controller chip of the backplane controller chip validation board, (b) transferring the validating commands and control data to the target backplane controller chip, (c) executing the validating commands by the program/verify/validate controller chip of the backplane controller chip validation board to verify the functions of the target backplane controller chip, (d) receiving feedback from the backplane simulator in response to the validating commands, (e) sending the feedback from the backplane simulator in response to the validating commands by the program/verify/validate controller chip of the backplane controller chip validation board to the host computer through the USB interface of the program/verify/validate controller chip of the backplane controller chip validation board, and (f) determining whether the function validations of the target backplane controller chip is successful by the host computer.

In yet another aspect, the present disclosure relates to a non-transitory computer storage medium. The non-transitory computer storage medium stored computer-executable instructions. When these computer-executable instructions are executed by a program/verify/validate controller chip of a backplane controller chip validation board, the program/ verify/validate controller chip performs one or more of following operations: (a) establishing communication between the backplane controller chip validation board and a host computer with a USB communication link, (b) installing at least one target backplane controller chip on one of target backplane controller chip sockets on the backplane controller chip validation board, (c) receiving backplane controller chip firmware from the host computer, (d) programming the target backplane controller chip with the backplane controller chip firmware from the host computer, (e) configuring the backplane simulator for validating the functions of the target backplane controller chip, (f) sending validating commands and control data from the host computer to the backplane controller chip validation board to validate the functions of the target backplane controller chip, and (g) sending validation results report from the backplane controller chip validation board to the host computer.

In certain embodiments, the backplane controller chip validation board has (a) a program/verify/validate controller chip, (b) one or more target backplane controller chip sockets, and (c) a backplane simulator. The program/verify/ validate controller chip has (a) backplane controller chip firmware verification software, (b) a USB interface, (c) a memory, (d) a software storage, and (e) a backplane controller interface. The target backplane controller chip sockets are used to install the target backplane controller chips to be programmed, verified, and validated. The backplane simulator is used to simulate functions of drives, LEDs, and other devices of a backplane for validating all functions of the backplane controller chip to be validated. The host computer includes (a) a user interface, (b) backplane controller chip validation software stored in a memory, (c) a USB interface, (d) a USB communication link, and (e) a software storage used to store backplane controller chip firmware. The user interface is used by a user to input validating commands and control data for validating functionalities of the target backplane controller chips.

In certain embodiments, the backplane controller chip validation board is configured to perform one or more of following operations: (a) receiving validating commands, control data, and the backplane controller chip firmware from the backplane controller chip validation software of the host computer, (b) programming the received backplane controller chip firmware into the software storage of the target backplane controller chip, (c) verifying the backplane controller chip firmware in the software storage of the target backplane controller chip, (d) sending received validating commands to the target backplane controller chip, (e) validating the functions of the target backplane controller chip, and (f) sending validation results back to the host computer over the USB interface of the program/verify/validate controller chip of the backplane controller chip validation board.

In certain embodiments, each of functions of the backplane controller chip is validated by performing one or more following operations: (a) receiving validating commands and control data for the functionality of the backplane controller chip from the backplane controller chip validation software of the host computer, at USB interface of the program/verify/validate controller chip of the backplane controller chip validation board, (b) transferring the validating commands and control data to the target backplane controller chip, (c) executing the validating commands by the program/verify/validate controller chip of the backplane controller chip validation board to verify the functions of the target backplane controller chip, (d) receiving feedback from the backplane simulator in response to the validating commands, (e) sending the feedback from the backplane simulator in response to the validating commands by the program/verify/validate controller chip of the backplane controller chip validation board to the host computer through the USB interface of the program/verify/validate controller chip of the backplane controller chip validation board, and (f) determining whether the function validations of the target backplane controller chip is successful by the host computer.

BRIEF DESCRIPTION OF THE DRAWINGS

The accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
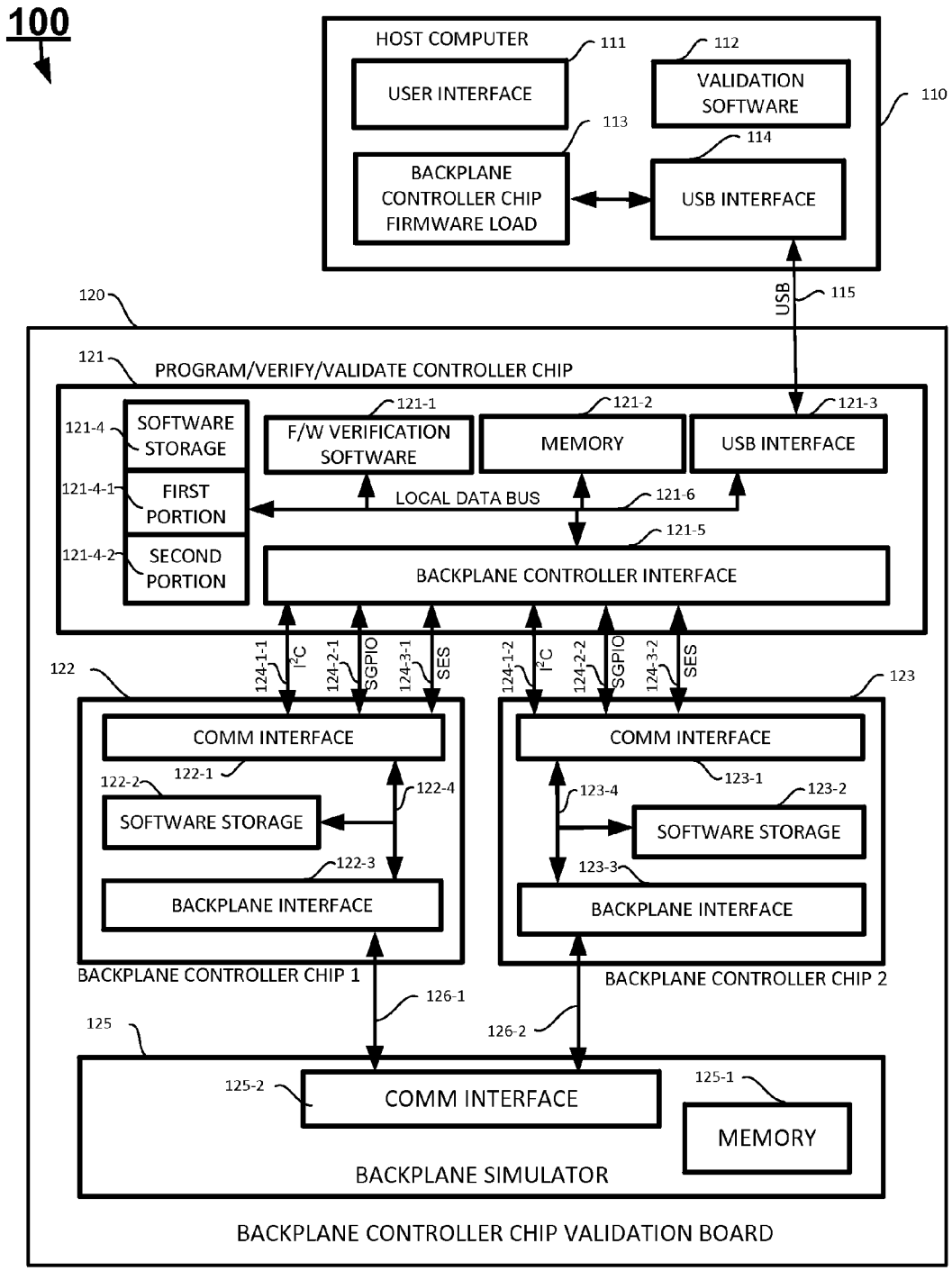
FIG. 1 shows a block diagram of a backplane controller chip and firmware validation system according one embodiment of the present disclosure.

The present disclosure is more particularly described in the following examples that are intended as illustrative only since numerous modifications and variations therein will be apparent to those skilled in the art. Various embodiments of the present disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the present disclosure or of any exemplified term. Likewise, the present disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, FIGS. 1-8, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art. Like numbers refer to like elements throughout.

As it is known to those skilled in the art, a large number of storage devices such as hard disk arrays, redundant array of independent disks (RAID), are utilized in data centers. These disk arrays are mounted on a backplane of chassis, and their status and operations can be managed and monitored by a remote user to access to a backplane controller chip mounted on the backplane. Backplanes are typically outfitted with Light Emitting Diodes LED to indicate particular conditions. Usually 2 or 3 LEDs are used per drive (or slot). These backplane LEDs includes: (a) Activity LED, (b) Fail/Rebuild/Predicted Failure LED, and (c) Locate LED. The Activity LED, usually Green, is used to indicate activity to the drive. Activity means that data is either read or written to the drive. Some equipment vendors will blink the Activity LED at a steady rate during activity (i.e. at 4 Hz), whereas others will actually turn the LED on and off synchronously with the actual activity. The Fail/Rebuild/Predicted Failure LED, if it exists, is most often Red. It is turned ON where a failure of the drive is detected. Some vendors also use blinking variations of this LED to indicate a rebuild condition, or a predicted failure condition. The Locate LED, when present, is typically Blue. It is turned on when a user selects a particular drive or drive slot through the storage management software. The locate LED is useful in locating a particular drive or drive-slot where there are large numbers of drives or banks of drives in large computer systems. Some vendors will blink the Locate LED rather than just illuminating it. Because not all vendors equip every drive slot with 3 LED, combinations of LEDs and blinking patterns may be used to indicate various conditions. If 2 LEDs only exist per drive, the first is typically Activity LED and the second is Fail LED.

The operations of hard disk drives are usually indicated by following drive states:
  (a) ON-LINE—This is the normal operating condition for a drive. There is no failure detected and the drive can be accessed.
  (b) ACTIVITY—This LED either turns on when a drive is installed and blinks OFF with activity. This is done so that the single LED can both indicate that the slot is populated as well as the actual activity to the slot.
  (c) FAIL—A solid Red LED indicates a drive that has failed, and is no longer operational. The failure would most likely be a result of data that was unsuccessfully read from or written to the drive. This condition will remain until the drive is replaced or rebuilt. One can also manually "Fail" a drive, which is useful in testing, in which case there is nothing physically wrong with the drive. A manually failed drive can be rebuilt and brought back on-line.
  (d) REBUILDING—A drive that is part of a RAID-array can be rebuilt, which means that the data on the drive is in the process of being restored from redundant media. If the rebuild succeeds, the drive becomes ON-LINE after the Rebuild. If the rebuild is terminated or fails, the drive will become FAILed.
  (e) PREDICTED FAILURE—A drive may successfully write data after a number of failed attempts. This case could be an indication that the storage medium is going bad. An HBA or RAID Controller can query the drive for such problems, and flag the drive with the prediction that it could fail in the near future, although it is currently operational. This can be indicated i.e. by a fast blinking Red LED.

The validation of the backplane controller chips and their firmware are at least tested on SGPIO mode and SES mode:
  (a) SGPIO (Serial General-Purpose Input/Output) is a 4-signal (or 4-wire) bus used between a Host computer and a backplane controller. Out of the 4 signals, 3 are driven by the host computer and 1 is driven by the backplane controller. Typically, the host computer is a storage controller located inside a server, desktop, rack or workstation computer that interfaces with Hard Disk Drives (HDDs) to store and retrieve data; and (b) SES (SCSI enclosure services) The host computer communicates with the disks in the enclosure (on a backplane) via a SCSI interface which may be Parallel SCSI, FC-AL, SAS, or SSA. One of the disk devices located in the enclosure is set up to allow SCSI Enclosure Services (SES) communication through a logical unit. The disk-drive then communicates with the SES processor in the enclosure, usually via Enclosure Services Interface (ESI), or a protocol called DSI for SSA enclosures. The data sent over the ESI or DSI interface is simply the contents of a SCSI command and the response to that command.

In additional to test the drives on the backplane, other elements such as flash memory, Power-On Reset (POR) chip, regulator, EEPROM, LED Driver, FRU, chassis temperatures, sensors, control circuits, rotation speed of the cooling fans, the supply voltage to the backplane, and transceivers can also be tested as a part of management functions validation of the backplane controller chips.

Referring now to FIG. 1, a block diagram of a backplane controller chip and firmware validation system 100 is shown according certain embodiments of the present disclosure. The backplane controller chip validation system 100 includes: a host computer 110, and a backplane controller chip validation board 120. In one embodiment, the host computer 110 has at least (a) a graphical user interface 111, (b) validation software 112, (c) a backplane controller chip firmware load 113 stored on the host computer and to be validated by the backplane controller chip validation system 100, (d) a USB interface 114, and (e) a USB communication link 115. In certain embodiments, other interfaces such as I²C bus interfaces, and SGPIO bus interfaces can also be used. The backplane controller chip validation board 120 is powered by the USB communication link 115 through the USB interface 114.

In certain embodiments, the host computer 110 includes one or more operating systems as well as one or more application programs. The operating system has a set of programs that control operations of the host computer 110. The operating system is operable to multitask, i.e., execute computing tasks in multiple threads, and thus may be any of the following: MICROSOFT CORPORATION's "WINDOWS XP" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc. The set of application programs, inclusive of certain utility programs, may also provide the graphical user interface 111 to the user, and the backplane controller chip validation software 112. The user uses the graphical user interface 111 and the backplane controller chip validation software 112 to verify the backplane controller chip firmware load, and validate the functionalities of the backplane controller chip on the backplane controller chip validation board 120. The functionalities of the backplane controller chip to be tested include various tests on the drives, as well as many other elements simulated on the backplane controller chip validation board 120 in both SES mode, and SGPIO mode. The backplane controller chip validation board 120 is powered by the USB communication interface 114 of the host computer 110.

In certain embodiments, the backplane controller chip to be tested is installed in a backplane controller chip socket of the backplane controller chip validation board 120. The backplane controller chip firmware load 113 is transferred from the host computer 110 to the backplane controller chip validation board 120 using the USB interface 114 through the USB communication link 115.

In certain embodiments, the backplane controller chip validation board 120 includes: (a) a program/verify/validate controller chip 121, (b) a first target backplane controller chip 122, (c) a second target backplane controller chip 123, and (d) a backplane simulator 125. The program/verify/validate controller chip 121 includes (a) a firmware verification software module 121-1, (b) a memory 121-2, (c) a USB interface 121-3, (d) a software storage 121-4, and (e) a backplane controller interface 121-5. The firmware verification software module 121-1 is used to control the operation of the backplane controller chip validation board 120. The memory 121-2 is used to temporarily store a backplane controller chip firmware load 113 on the backplane controller chip validation board 120 to be verified. The USB interface 121-3 is used to communicate with the host computer 110 to: (a) receive the backplane controller chip firmware load 113 from the host computer 110, (b) receive instructions from the host computer 110 for verification of the backplane controller chip firmware load, and validation of the functionalities of the backplane controller chip firmware, and (c) report verification and validation results back to the host computer 110. The software storage 124-1 includes a first portion 121-4-1, and a second portion 121-4-2. In order to cover the verification and validation of a wider variety of backplane controller chips, the backplane controller chip validation board 120 may include one or more types of backplane controller chip sockets to install one or more target backplane controller chips to be verified or validated.

In FIG. 1, the first target backplane controller chip 122 and the second target backplane controller chip 123 are shown as an example, and the first and second backplane controller chips 122 and 123 are mounted on two separate backplane controller chip sockets. The backplane controller chip validation board 120 may include more than two backplane controller chip sockets. The backplane controller interface 121-5 is used for the program/verify/validate controller chip 121 to communicate with the first and second target backplane controller chips 122 and 123 through various communication links. The communication links between the backplane controller chip interface 121-5 of the program/verify/validate controller chip 121 and the communication interface 122-1 of the first target backplane controller chip 122 include: (a) a first I²C communication link 124-1-1, (b) a first SGPIO communication link 124-2-1, and (c) a first SES communication link 124-3-1. The communication links between the backplane controller chip interface 121-5 of the program/verify/validate controller chip 121 and the communication interface 123-1 of the second target backplane controller chip 123 include: (d) a second I²C communication link 124-1-2, (e) a second SGPIO communication link 124-2-2, and (f) a second SES communication link 124-3-2. These communication links are used to transmit control commands and control data from the program/verify/validate controller chip 121 to the first target backplane controller chip 122 and the second target backplane controller chip 123 for programming and verifying the target backplane controller chips, and validating the functions of the backplane controller chip firmware.

In certain embodiments, the first target backplane controller chip 122 has at least a communication interface 122-1, a software storage 122-2, and a first backplane interface 122-3. The second target backplane controller chip 123 has at least a communication interface 123-1, a software storage 123-2, and a second backplane interface 123-3. The backplane interface 122-3 of the first target backplane controller chip 122 is used to send a first backplane controller signal 126-1 to a communication interface 125-2 of the backplane simulator 125 for sending out control commands and control data to the first target backplane controller chip 122. The second backplane interface 123-3 of the second target backplane controller chip 123 is used to send a second backplane controller signal 126-2 to the communication interface 125-2 of the backplane simulator 125 for sending out control commands and control data to the second target backplane controller chip 123. The verification of the backplane controller chip firmware and validation of the backplane controller chip can be performed on either one of the first target backplane controller chip 123-1 and the second target backplane controller chip 123-2, independently and concurrently.

In certain embodiments, the backplane simulator 125 simulates the functions of a backplane. A number of hard disk drives are installed on the backplane, therefore, the backplane simulator 125 may include the simulation of the operation of these hard disk drives, the LEDs associated with these hard disk drives, and many other elements or devices including flash memory, Power-On Reset (POR) chip, regulator, EEPROM, LED Driver, FRU, chassis temperatures, sensors, control circuits, sensors for detecting rotation speed of the cooling fans, the supply voltage to the backplane, and transceivers. The backplane simulator 125 has a communication interface 125-2 for communicating with the backplane controller chip through the first backplane interface 122-3 of the first target backplane controller chip 122 and the second backplane interface 123-3 of the second target backplane controller chip 123. The backplane simulator 125 also has a memory 125-1 to store the operation states of the hard disk drives attached to the backplane and LEDs associated with the hard disk drives, as well as the operation states of the other elements attached to the backplane.

In certain embodiments, the communication between the host computer 110, and the backplane controller chip validation board 120 is carried out via the USB interface 114 of the host computer 110, and the USB interface 121-3 of the program/verify/validate controller chip 121 of the backplane controller chip validation board 120 through the USB communication link 115.

In certain embodiments, the communications inside the program/verify/validate controller chip 121 are carried out via a local data bus 121-6. The communications inside the first target backplane controller chip 122 are carried out via a local data bus 122-4. The communications inside the second target backplane controller chip 123 are carried out via a local data bus 124-4. The communications between the program/verify/validate controller chip 121 and the first target backplane controller chip 122 are carried out via the first I²C communication link 124-1-1, the first SGPIO communication link 124-2-1, and the first SES communication link 124-3-1. The communications between the program/verify/validate controller chip 121 and the second target backplane controller chip 123 are carried out via the second I²C communication link 124-1-2, the second SGPIO communication link 124-2-2, and the second SES communication link 124-3-2. The control commands and control data transmitted between the program/verify/validate controller chip 121 and the first and the second target backplane controller chips 122 and 123 are in accordance with the I²C specification, the SGPIO specification, and the SES specification, respectively.

The communication between the first backplane interface 122-3 of the first target backplane controller chip 122 and the communication interface 125-2 of the backplane simulator 125 are carried out via the first backplane controller signal 126-1. The communication between the second backplane interface 123-3 of the second target backplane controller chip 123 and the communication interface 125-2 of the backplane simulator 125 are carried out via the second backplane controller signal 126-2.

The programming and verifying of backplane controller chip includes three major parts:
  (a) verification of the backplane controller chip firmware binary image;
  (b) programming the verified backplane controller chip firmware binary image onto the backplane controller chip; and
  (c) verification of functionalities of the backplane controller chip.

The host computer 110 is used to create the backplane controller chip firmware load. Once the development of the backplane controller chip firmware load is completed, the host computer 110 is used to compile and build a backplane controller chip firmware binary image. The backplane controller chip and firmware validation system 100 is then used to verify the backplane controller chip firmware binary image, and program the backplane controller chip with the backplane controller chip firmware binary image. The programming of the firmware binary image is successful if (a) target backplane controller chip ID, the firmware revision, the checksum, and last page of the firmware binary image are verified, and (b) the firmware binary image is programmed through a programming interface, and the target backplane controller chip ID, the firmware revision, the checksum, and last page of the firmware binary image programmed on the target backplane controller chip are verified. The programming interface includes: the first I²C communication link 124-1-1, the first SGPIO communication link 124-2-1, and the first SES communication link 124-3-1 for the first target backplane controller chip 122, and the second I²C communication link 124-1-2, the second SGPIO communication link 124-2-2, and the second SES communication link 124-3-2 for the second backplane controller chip 123. The control commands and control data transmitted through the programming interface are in accordance with the I²C specification, the SGPIO specification, and the SES specification, respectively.

In addition to the verification of the firmware binary image, the backplane controller chip validation system 100 is also used to verify the functionalities of the backplane controller chip firmware programmed on the backplane controller chip. The verification of the functionalities of the backplane controller chip and its firmware binary image programmed on the backplane controller chip is successful if (a) the target backplane controller chip ID of the firmware binary image is verified, (b) the functionalities validation in SES mode is successful, and (c) the functionalities validation in SGPIO mode is successful. The functionalities validation in both SES mode and the SGPIO mode may include functionalities validations for the drives, and the other elements and devices attached to the backplane controller chip.

In certain embodiments, the functionalities validation in SES mode includes validating the compatibility of the backplane controller chip with commands defined by SCSI Enclosure Services-2 (SES-2) revision 20, published on May 12, 2008 by T10, a Technical Committee of Accredited Standards Committee INCITS (International Committee for Information Technology Standards), which is incorporated herein by reference in its entirety. For example, the host computer 110 can construct control commands and data in accordance with the SES-2 specification and transmit those commands and data to the backplane controller chips 123-1 or 123-2 mounted on the backplane controller chip sockets through the USB interface 121-3 of the program/verify/validate controller chip 121.

In certain embodiments, the host computer 110 can be used for system configuration of the backplane simulator 125. The settings include:

(a) the number of hard disk drives are installed on the backplane and attached to the backplane controller chip;
(b) the operation states of these hard disk drives;
(c) the operation states of the LEDs associated with these hard disk drives;
(d) the temperature reading of the sensors mounted on the backplane;
(e) the supply voltage reading of the power supply to the backplane;
(f) the rotation speed of the cooling fans on the backplane;
(g) many other parameters of other elements;
(h) a chipset selection for the user to select one of many backplane controller chipsets available;
(i) an interface selection for the user to select one of many interfaces available, such as SES, SMBus, and IPMI;
(j) a group/controller selection for the user to select the group to test, when more than one backplane controller chips are tested,
(k) a drives per group selection for the user to set up the number of drives per group to be tested, and the number can be an integer from 1 through 16,
(l) an SGPIO setting for the user to set the register address and the clock frequency of the first SGPIO communication link 124-2-1 and the second SGPIO communication link 124-2-2;
(m) an SMBus address and SGPIO group setting for the user to set the SMBus address;
(n) a SMBus setting,
(o) a SCSI Enclosure Services (SES) setting;
(p) an IPMI setting; and
(q) interface enabler.

Each of the SMBus setting, the SES setting, and the IPMI setting has a first checkbox 0 and a second checkbox 1. If the first checkbox 0 is checked, the first SMBus or the first SGPIO bus is used. If the second checkbox 1 is checked, the second SMBus or the second SGPIO bus is used. When one of the checkboxes in the interface enabler is checked, one of the three interfaces SGPIO, SES, and IPMI is used.

The settings of the backplane simulator 125 is stored in a memory 125-1 of the backplane simulator 125. When the validation of the functionalities of the backplane controller chip is carried out in SES mode, the first backplane controller signal 126-1 and the second backplane controller signal 126-2 are used between the backplane controller chip and the backplane simulator 125, and when the validation of the functionalities of the backplane controller chip is carried out in SGPIO mode, the first SGPIO communication link 124-2-1 and the second SGPIO communication link 124-2-2 are used between the first and second backplane controller chips 122 and 123 and the backplane simulator 125. In certain embodiments, the validation of the functionalities of the backplane controller chip firmware load includes one or more of following operations:

(a) the user uses the user interface 111 of the host computer 110 to set up the settings of the backplane simulator 125;
(b) the user uses the user interface 111 of the host computer 110 to send a control command to perform a backplane control function, such as adjust the operation of the hard disk drives, or measure the temperature of the hard disk drives, and the backplane simulator 125 changes the operation states of the hard disk drives accordingly;
(c) after the backplane simulator 125 changes the operation states of the hard disk drives, the memory 125-1 of the backplane simulator 125 is updated;
(d) the backplane simulator 125 send the update (the results of the control command) back to the host computer 110; and
(e) the host computer 110 compares the received result with a desired result and determine whether the function performed is successful.

In certain embodiments, the validation software 112 of the host computer 110 can construct control commands and data in accordance with various proprietary protocols over SMBus and transmit those commands and the data to the backplane controller chip 123-1 or 123-2 through the communication interface 122-1 or 123-1. Accordingly, the host computer 110 utilizes the validation software 112 to send the commands and data of the proprietary protocol through the first backplane interface 122-3 of the first target backplane controller 122, and the second backplane interface 123-3 of the second target backplane controller 123 to the communication interface 125-2 of the backplane simulator 125.

In certain embodiments, the validation software 112 can be configured to test the compatibility of the backplane controller chips with commands defined by Intelligent Platform Management Interface Specification, Second Generation v2.0, Document Revision 1.0, published on Feb. 12, 2004, which is incorporated herein by reference in its entirety. For example, the validation software 112 of the host computer 110 can construct control commands and data in accordance with IPMI specification and transmit those commands and data to the backplane simulator 125 through the communication interface 125-2 of the backplane simulator 125. The backplane simulator 125 receives the control commands and data through the first backplane controller signal 126-1 and the second backplane controller signal 126-2. In certain embodiments, the backplane simulator 125 can respond to the control commands and data accordingly through the first backplane controller signal 126-1 and the second backplane controller signal 126-2. For example, if the backplane simulator 125 does not respond accordingly, it can be determined that the backplane simulator 125 does not function correctly in accordance with the IPMI specification. In certain embodiments, the validation software 112 of the host computer 110 can receive and decode IPMI and $I^2C$ alert events, and then transmit corresponding data to the user interface 111 of the host computer 110 for display. In certain embodiments, a selected set of extended OEM IPMI commands is also tested for certain OEM vendors.

In certain embodiments, the validation software 112 of the host computer 110 can utilize the first backplane controller signal 126-1 and the second backplane controller signal 126-2 to simulate and test IPMI, SCSI Enclosure Services (SES) and $I^2C$ register read/write function supported by the backplane controller.

In certain embodiments, the user interface 111 of the host computer 110 may include following exemplary command sections:

(a) an SMBus command area including command buttons such as "Enable SMBus Alert", "Generate Temp Alert", "Restore Temp Threshold", "Read Last Page", "Validate CheckSum", "Register Dump", "Read Register", and "Write Register", (b) an SES command area including command buttons such as "Identify", "Page 0", "Page 1", "Page 2", "Write 02", "Page 7", "Page 10", and "Start SES Stress; and (c) an IPMI command area including (c-1) an OEM command area having a motherboard selection pull-down menu for the tester to select a motherboard to test, and command buttons such as: "Select MB", "Get MB Select", "Set BMC Address", "Get BMC Address", "Validate CheckSum", "Set Fault Light State", "Get Fault Light State", "Get Fault Status", "Drive Pointer Status", SGPIO Frequency Status", and "Read Last Page", (c-2) a Storage FRU Inventory Area having command buttons such as "Get FRU Inventory Area", "Write FRU Inventory Data", and "Read FRU Inventory Data". The Application Area includes command buttons such as "Get Device ID", "Broadcast Device ID", and "Get Self Test Result", (c-3) an Application Area having command buttons such as "Get Device ID", "Broadcast Device ID", and "Get Self Test Result"; and (c-4) a Sensor Data Area having command buttons: a first "Set Event Receiver" with a pull-down menu to allow the tester to set the Event Receiver, "Disable Event Receiver" with a pull-down menu to allow the tester to disable the Event Receiver, a second "Set Event Receiver" with a pull-down menu to allow the tester to set the Event Receiver, "Set Sensor Hysteresis" with a pull-down menu to allow the tester to set the Sensor Hysteresis, "Get Sensor Hysteresis" with a pull-down menu to allow the tester to get the Sensor Hysteresis, "Set Sensor Thresholds" and "Get Sensor Thresholds", and (d) an event section includes IPMI and SMBus event response area. This area is used to display the event log while the backplane controller chip is been verified or validated. It may all IPMI event logs and the SMBus event logs.

Figure 2:
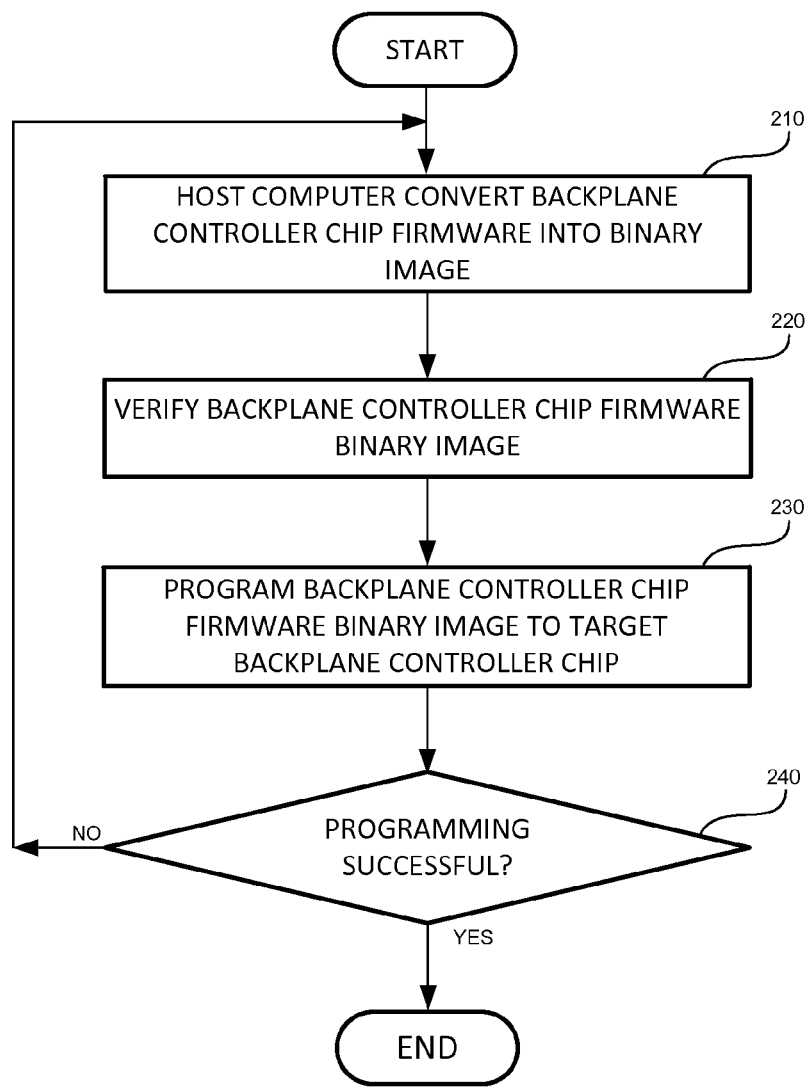
FIG. 2 shows a flow chart of a backplane controller chip firmware programming process according certain embodiments of the present disclosure.

Referring now to FIG. 2, a flow chart of a backplane controller chip firmware programming process is shown according certain embodiments of the present disclosure. The flow chart 200 includes three operations:

After the start at operation 210, the host computer 110 is used to compile the backplane controller chip firmware and convert the backplane controller chip firmware load 113 from source code to firmware binary image.

At the next operation 220, the host computer 110 is used to verify the backplane controller chip firmware binary image. Detailed verification process is described in the verification process 220 in the FIG. 3.

At the next operation 230, the host computer 110 is used to program the backplane controller chip firmware binary image into a target backplane controller chip installed on one of the backplane controller chip sockets of the backplane controller chip validation board 120. Detailed programming process is described in the programming process 230 in the FIG. 4.

At the inquiry operation 240, the host computer 110 proceeds to the end if the programming and verification of the backplane controller chip firmware are successful, and goes back to the operation 210 if the programming and verifying of the backplane controller chip firmware are not successful.

Figure 3:
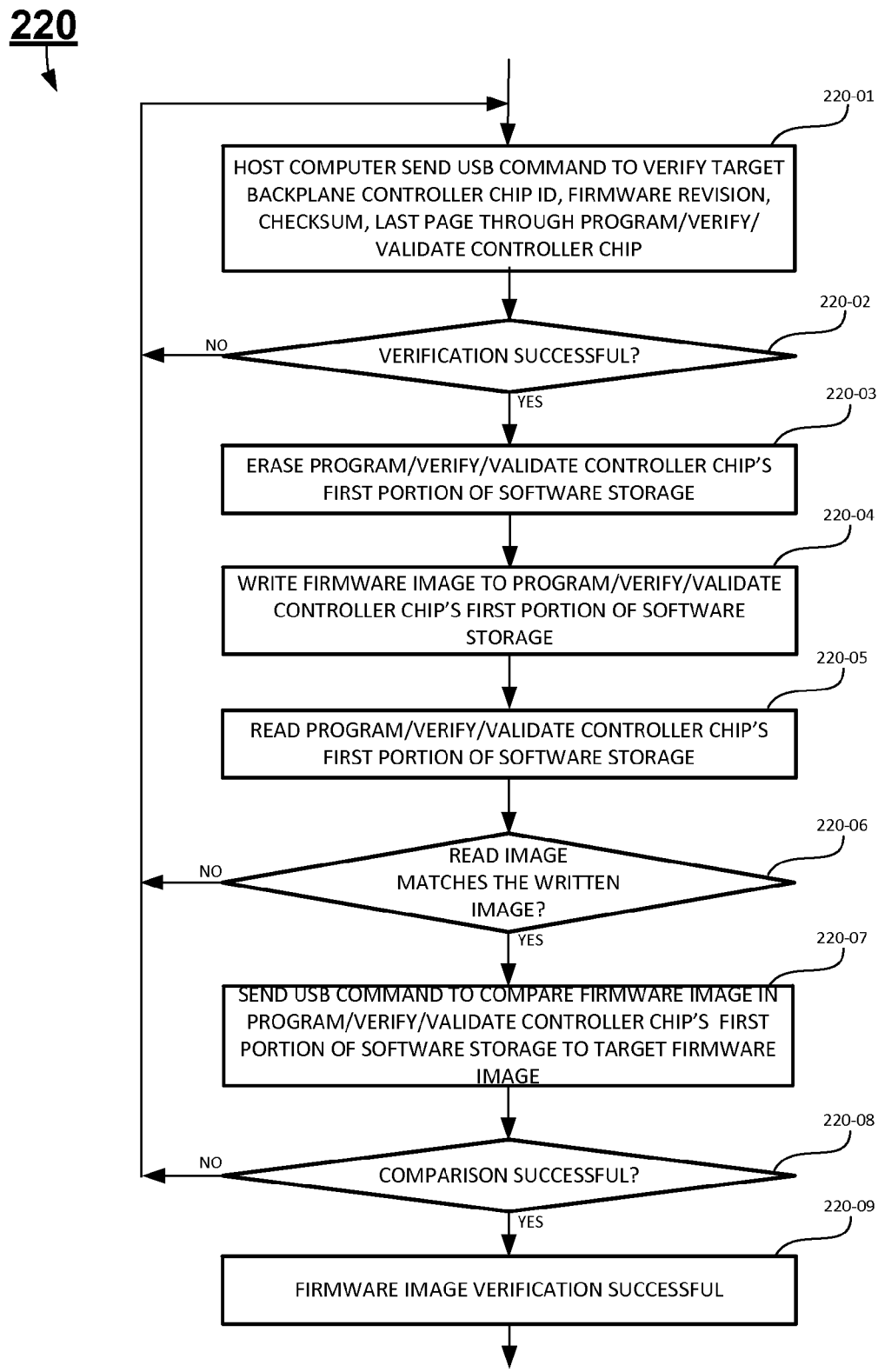
FIG. 3 shows a detailed firmware binary image verification portion of the flow chart of the backplane controller chip firmware programming process shown in FIG. 2 according certain embodiments of the present disclosure.

FIG. 3 shows a detailed firmware binary image verification portion of the flow chart of the backplane controller chip firmware programming process shown in FIG. 2 according certain embodiments of the present disclosure. In this embodiment, the first target backplane controller chip 122 is used here for illustration. The similar operations can be used on the second target backplane controller chip 123.

At operation 220-01, the host computer 110 sends a USB command to the backplane controller chip validation board 120 through the USB interface 114 to the USB interface 121-3 of the program/verify/validate controller chip 121 of the backplane controller chip validation board 120 over the USB communication link 115 to verify target backplane controller chip ID, current firmware revision, firmware binary image checksum, and the last page of the backplane controller chip firmware binary image.

At inquiry operation 220-02, the host computer 110 checks if the information verification of the operation 220-01 is successful. If it is successful, the host computer 110 proceeds to operation 220-03. Otherwise, the host computer 110 goes back to operation 220-01 to verify the information again.

At operation 220-03, the host computer 110 erases the first portion 121-4-1 of the software storage 121-4 of the program/verify/validate controller chip 121.

At operation 220-04, the host computer 110 writes the backplane controller chip firmware binary image to the first portion 121-4-1 of the software storage 121-4 of the program/verify/validate controller chip 121.

At operation 220-05, the host computer 110 reads back the backplane controller chip firmware binary image from the first portion 121-4-1 of the software storage 121-4 of the program/verify/validate controller chip 121.

At inquiry operation 220-06, the host computer 110 compares the backplane controller chip firmware binary image read from the first portion 121-4-1 of the software storage 121-4 of the program/verify/validate controller chip 121 and the backplane controller chip firmware binary image written to the first portion 121-4-1 of the software storage 121-4 of the program/verify/validate controller chip 121. If the firmware binary image read from the first portion 121-4-1 of the software storage 121-4 of the program/verify/validate controller chip 121 are the same as the firmware binary image written to the first portion 121-4-1 of the software storage 121-4 of the program/verify/validate controller chip 121, the process proceeds to operation 220-07. Otherwise, the process goes back to operation 220-01.

At operation 220-07, the host computer 110 sends a USB command to the backplane controller chip validation board 120 to compare the backplane controller chip binary image on the first target backplane controller chip 122 and the written backplane controller chip firmware binary image on the first portion 121-4-1 of the software storage 121-4 of the program/verify/validate controller chip 121.

At inquiry operation 220-08, if the backplane controller chip binary image on the target backplane controller chip 122 and the written backplane controller chip firmware binary image on the first portion 121-4-1 of the software storage 121-4 of the program/verify/validate controller chip 121 are the same, the process proceeds to operation 220-09. Otherwise, the process goes back to operation 220-01.

At operation 220-09, the backplane controller chip firmware binary image verification is successful.

Figure 4:
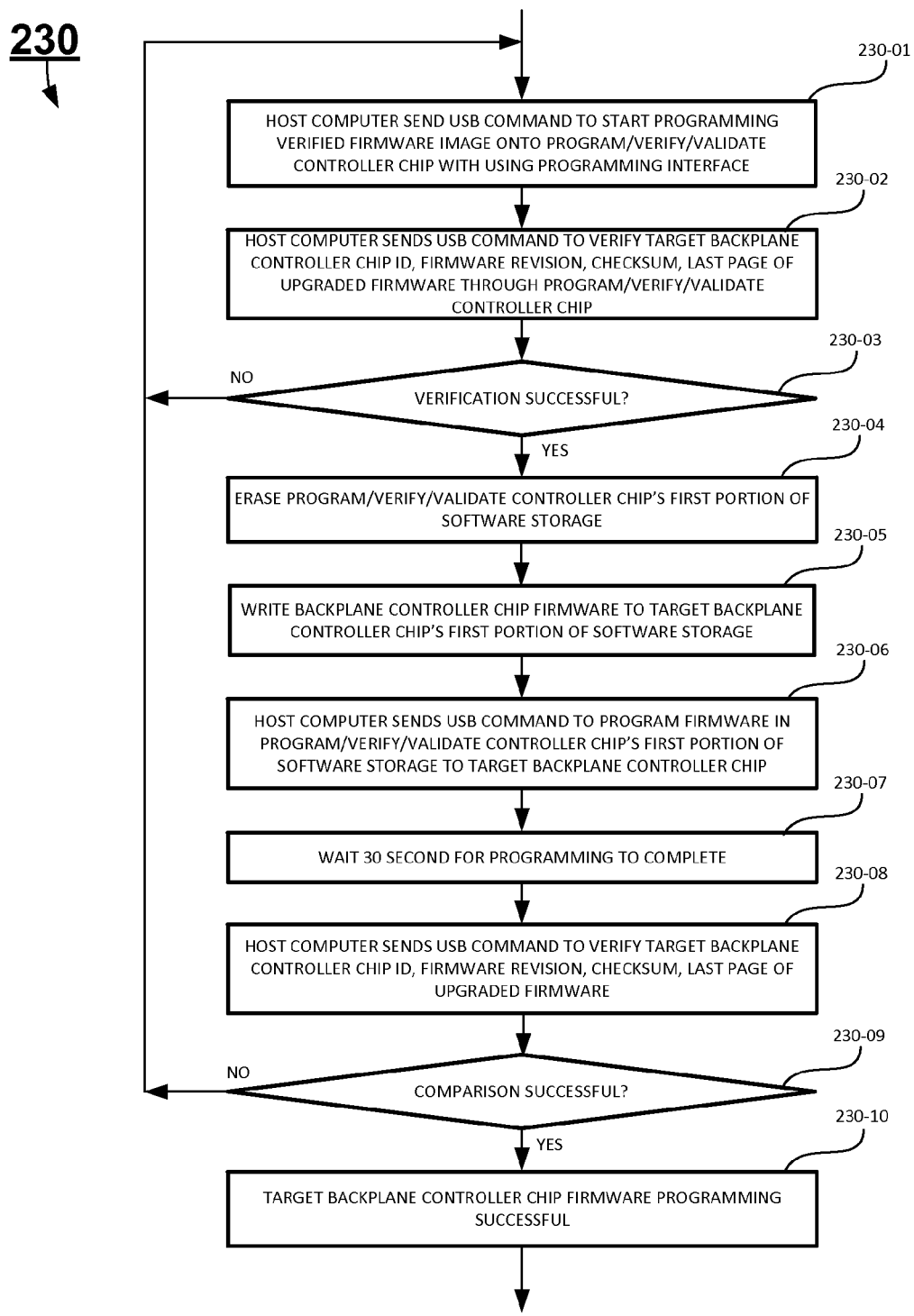
FIG. 4 shows a detailed firmware binary image programming to target backplane controller chip portion of the flow chart of the backplane controller chip firmware programming process shown in FIG. 2 according certain embodiments of the present disclosure.

FIG. 4 shows a detailed firmware binary image programming to target backplane controller chip portion of the flow chart of the backplane controller chip firmware programming process shown in FIG. 2 according certain embodiments of the present disclosure.

At operation 230-01, the host computer 110 sends a USB command to the backplane controller chip validation board 120 to program one of the two target backplane controller chips. The firmware verification software module 121-1 of the program/verify/validate controller chip 121 receives the command and executes the command to receive the backplane controller chip firmware binary image stored in backplane controller chip firmware load 113 of the host computer 110 through a programming interface. The programming interface includes the USB interface 114 of the host computer 110, the USB communication link 115 of the host computer 110, and the USB interface 121-3 of the program/verify/validate controller chip 121 of the backplane controller chip validation board 120. The host computer 110 then transfers the backplane controller chip firmware binary image in a series of USB packets to the memory 121-2 of the backplane controller chip validation board 120.

At operation 230-01, the host computer 110 sends a USB command to the backplane controller chip validation board 120 to program one of the two target backplane controller chips. The firmware verification software module 121-1 of the program/verify/validate controller chip 121 receives the command and executes the command to receive the backplane controller chip firmware binary image stored in backplane controller chip firmware load 113 of the host computer 110 through a programming interface. The programming interface includes the USB interface 114 of the host computer 110, the USB communication link 115 of the host computer 110, and the USB interface 121-3 of the program/verify/validate controller chip 121 of the backplane controller chip validation board 120. The host computer 110 then transfers the backplane controller chip firmware binary image in a series of USB packets to the memory 121-2 of the backplane controller chip validation board 120.

At operation 230-02, the host computer 110 sends a USB command to the backplane controller chip validation board 120 to verify target backplane controller chip ID, firmware revision, checksum, and the last page of the backplane controller chip firmware binary image.

At inquiry operation 230-03, if the verification is successful, the process continues on to operation 230-05. Otherwise, the process returns to the beginning operation 230-01.

At operation 230-04, the host computer 110 erases the first portion 121-4-1 of the software storage 121-4 of the program/verify/validate controller chip 121.

At operation 230-05, the host computer 110 writes the target backplane controller chip firmware to the first portion 121-4-1 of the software storage 121-4 of the program/verify/validate controller chip 121 from the memory 121-2 of the program/verify/validate controller chip 121.

At operation 230-06, the host computer 110 sends a USB command to program the firmware in the first portion 121-4-1 of the software storage 121-4 of the program/verify/validate controller chip 121.

At operation 230-07, the host computer 110 waits a predetermined time period for the programming to complete. In one embodiment, the predetermined time period may be up to 30 seconds.

At operation 230-08, the host computer 110 sends a USB command to verify the target backplane controller chip ID, its firmware revision, the checksum and last page of the newly upgraded firmware.

At inquiry operation 230-09, the host computer 110 checks the result of the verification. If the verification is successful, the process proceeds to operation 230-11. Otherwise, the process returns back to the beginning operation 230-01 to start over.

At operation 230-10, the verification and programming process is terminated.

Figure 5:
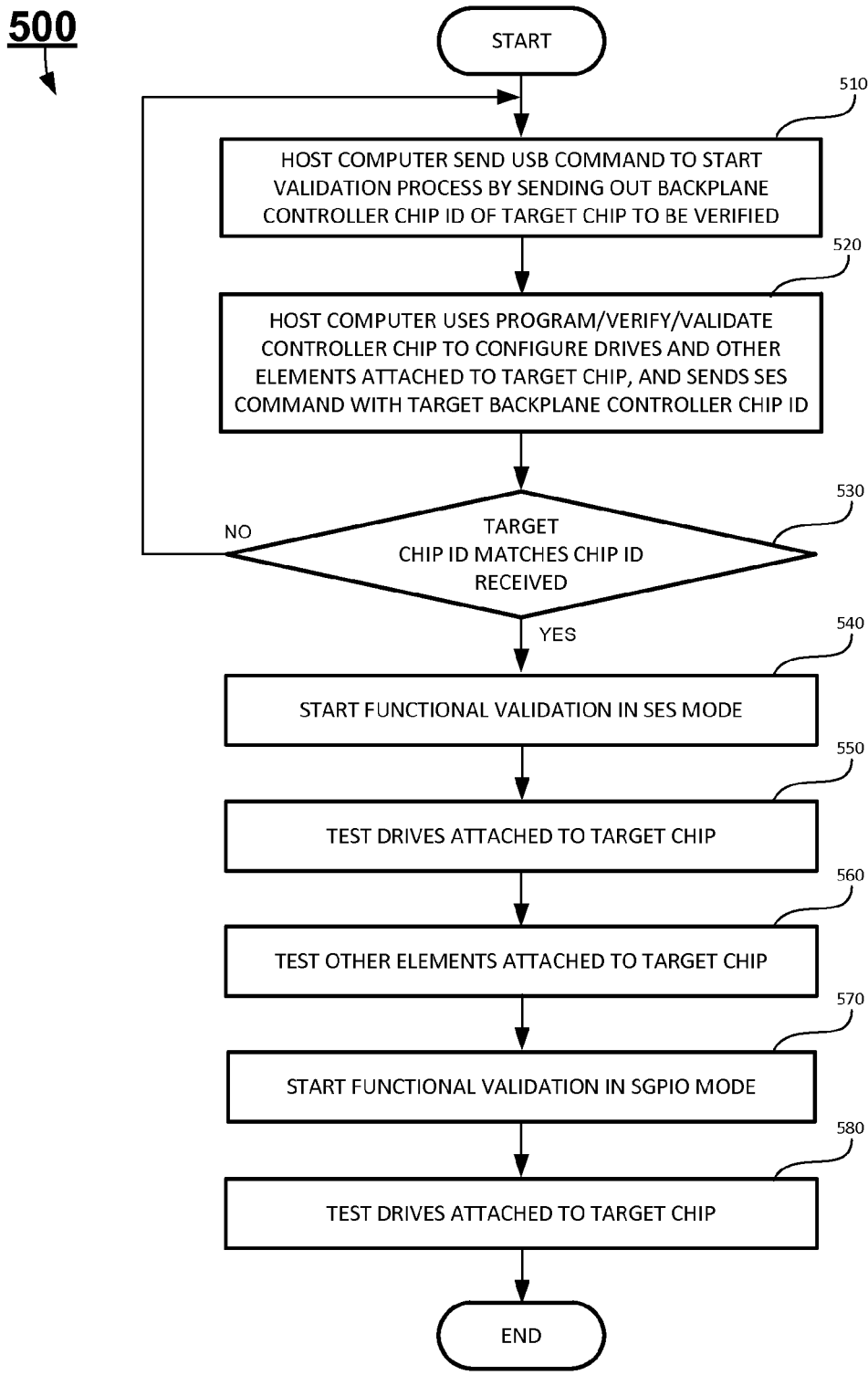
FIG. 5 shows a flow chart of a backplane controller chip firmware verification process according certain embodiments of the present disclosure.

FIG. 5 shows a flow chart of a backplane controller chip verification process according certain embodiments of the present disclosure.

At operation 510, the host computer 110 sends a USB command to the backplane controller chip validation board 120 to start the functionality verification process. The host computer 110 sends out a target backplane controller chip ID to be verified to the backplane controller chip validation board 120.

At operation 520, the host computer 110 uses a target backplane controller chip such as 123-1 to configure the drives, other elements and devices (simulated by the backplane simulator 125) attached to the first target backplane controller chip 122, and sends SES command with the target backplane controller chip ID.

At inquiry operation 530, the program/verify/validate controller chip 121 of the backplane controller chip validation board 120 compares the target backplane controller chip ID received from the host computer 110 with the backplane controller chip ID of the first target backplane controller chip 122 already mounted on a backplane controller chip socket. If the target backplane controller chip ID received from the host computer 110 matches the backplane controller chip ID already mounted on the backplane controller chip socket, then continue the validation process to operation 540. Otherwise, the process returns to the beginning operation 510 to start over.

At operation 540, the host computer 110 starts the functional verification in SES mode on the backplane controller chip validation board 120.

At operation 550, the host computer 110 verifies the functionalities of the drives attached to the target backplane controller chip in SES mode, using the backplane controller chip firmware programmed on the backplane controller chip. The detailed description of this process is given in FIG. 6.

At operation 560, the host computer 110 verifies the functionalities of other elements and devices attached to the target backplane controller chip in SES mode, using the backplane controller chip firmware programmed on the backplane controller chip. The detailed description of this process is given in FIG. 7.

At operation 570, the host computer 110 starts the functional verification in SGPIO mode on the backplane controller chip validation board 120.

At operation 580, the host computer 110 verifies the functionalities of the drives attached to the target backplane controller chip in SGPIO mode, using the backplane controller chip firmware programmed on the backplane controller chip. The detailed description of this process is given in FIG. 8.

Figure 6:
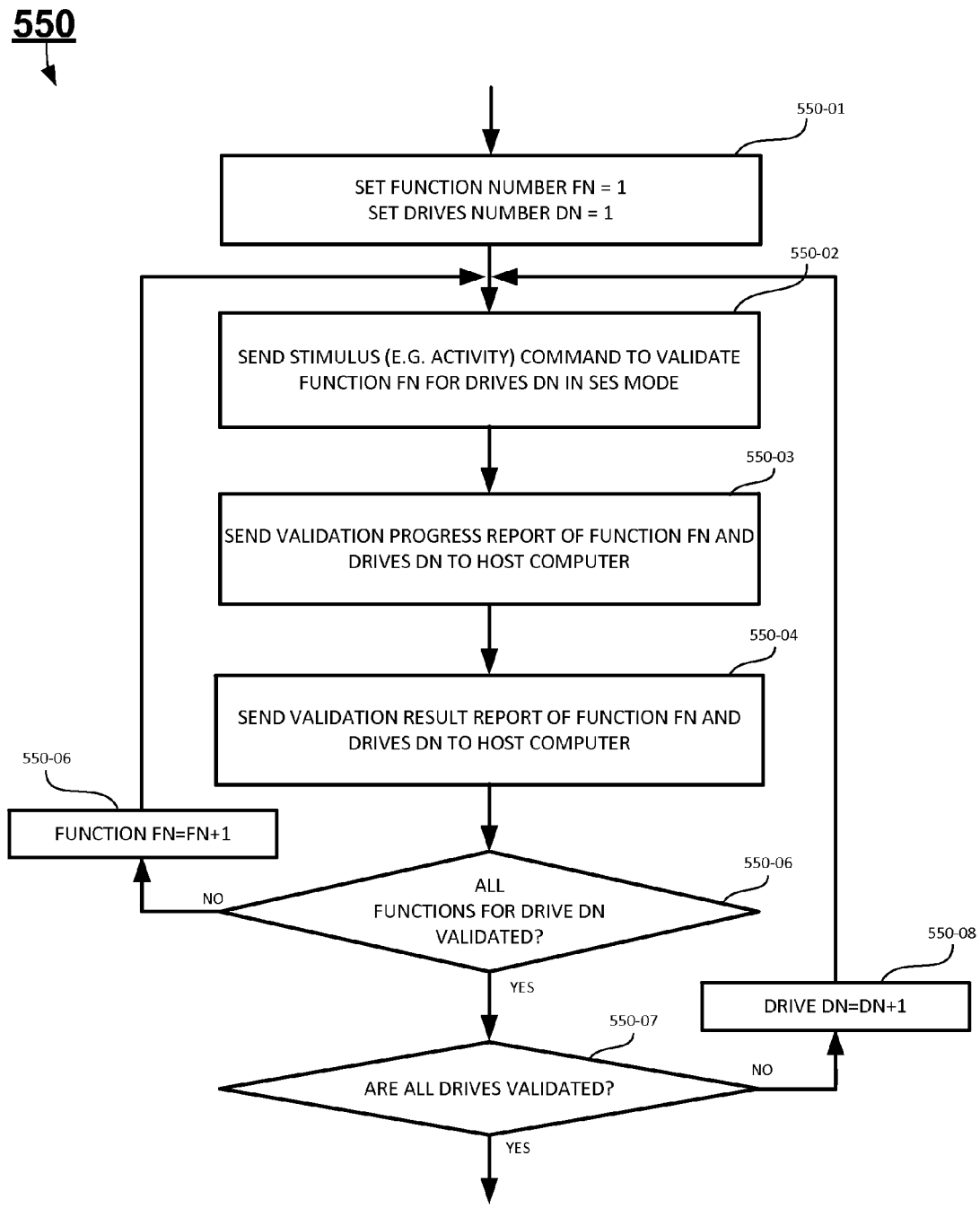
FIG. 6 shows more detailed drives functionality verification portion of the functional verification in SES mode of the flow chart of the backplane controller chip firmware verification process shown in FIG. 5 according certain embodiments of the present disclosure.

FIG. 6 shows more detailed drives functionality verification portion 550 of the functional verification in SES mode of the flow chart of the backplane controller chip firmware verification process shown in FIG. 5 according certain embodiments of the present disclosure.

At operation 550-01, the host computer 110 initializes the drives number DN to 1, and function number for the function to be validated FN to 1.

At operation 550-02, the host computer 110 sends stimulus (e.g. activities) command for verifying function FN of the drive DN to the backplane controller validation board 120 to verify the function FN in SES mode.

At operation 550-03, the backplane controller validation board 120 sends verification progress report for function FN of the drive DN to the host computer 110 during the verification process.

At operation 550-04, the backplane controller validation board 120 sends verification result report for function FN of the drive DN to the host computer 110.

At operation 550-05, the host computer 110 checks if all functions of the drive DN are validated. If all functions of the drive DN are validated, the process continues to operation 550-07. Otherwise, the function number FN is incremented in operation 550-06 and returns to the operation 550-02.

At operation 550-07, the host computer 110 checks if all functions of the drive DN are verified. If all functions of the drive DN are verified, the process continues to operation 550-07. Otherwise, the function number FN is incremented in operation 550-06 and returns to the operation 550-02.

Figure 7:
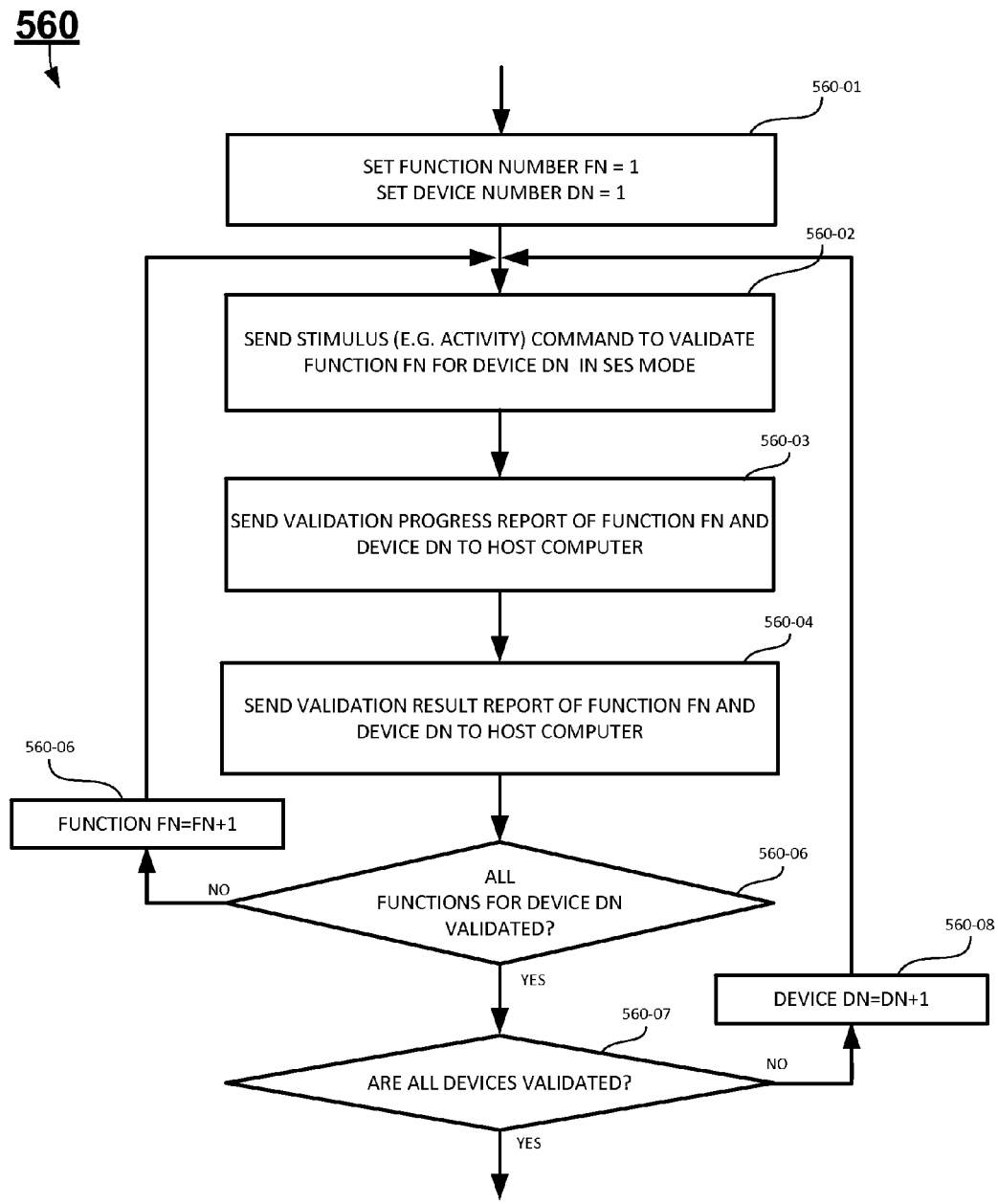
FIG. 7 shows more detailed other elements functionality verification portion of the functional verification in SES mode of the flow chart of the backplane controller chip firmware verification process shown in FIG. 5 according certain embodiments of the present disclosure.

FIG. 7 shows more detailed other elements functionality verification portion 560 of the functional verification in SES mode of the flow chart of the backplane controller chip firmware verification process shown in FIG. 5 according certain embodiments of the present disclosure.

At operation 560-01, the host computer 110 initializes device (and other elements) number DN to 1, and function number FN for the function to be validated to 1.

At operation 560-02, the host computer 110 sends stimulus (e.g. activities) command for verifying function FN of the device DN to the backplane controller validation board 120 to verify the function FN in SGPIO mode.

At operation 560-03, the backplane controller validation board 120 sends verification progress report for function FN of the device DN to the host computer 110 during the verification process.

At operation 560-04, the backplane controller validation board 120 sends verification results report for function FN of the device DN to the host computer 110.

At operation 560-05, the host computer 110 checks if all functions of the drive DN are verified. If all functions of the drive DN are verified, the process continues to operation 560-07. Otherwise, the function number FN is incremented in operation 560-06 and returns to the operation 560-02.

At operation 560-07, the host computer 110 checks if all functions of the drive DN are verified. If all functions of the drive DN are verified, the process continues to operation 560-07. Otherwise, the function number FN is incremented in operation 560-06 and returns to the operation 560-02.

Figure 8:
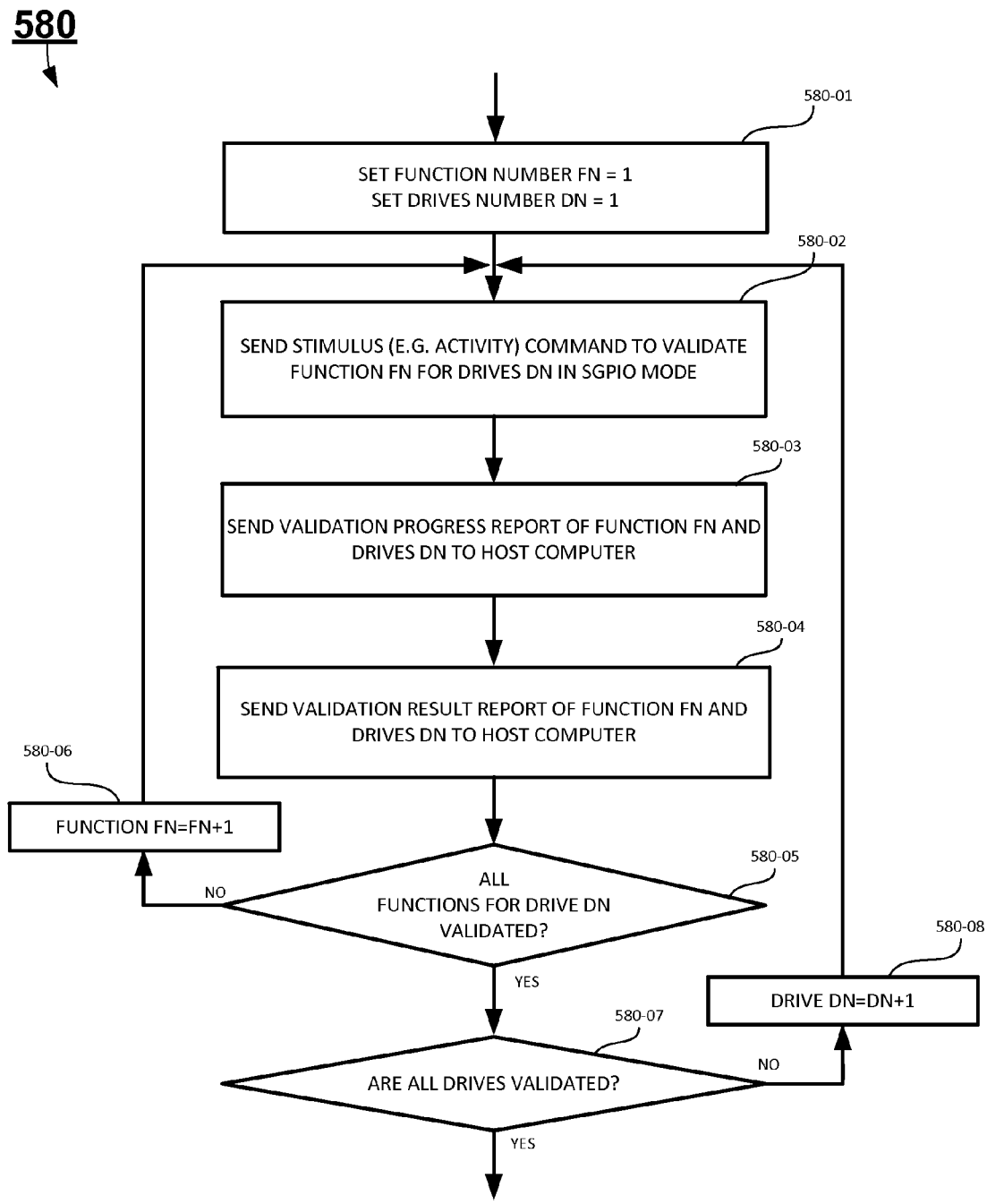
FIG. 8 shows more detailed drives functionality verification portion of the functional verification in SGPIO mode of the flow chart of the backplane controller chip firmware verification process shown in FIG. 5 according certain embodiments of the present disclosure.

FIG. 8 shows more detailed drives functionality verification portion 580 of the functional verification in SGPIO mode of the flow chart of the backplane controller chip firmware verification process shown in FIG. 5 according certain embodiments of the present disclosure.

At operation 580-01, the host computer 110 initializes the drives number DN to 1, and function number for the function to be validated FN to 1.

At operation 580-02, the host computer 110 sends stimulus (e.g. activities) command for verifying function FN of the drive DN to the backplane controller validation board 120 to verify the function FN in SGPIO mode.

At operation 580-03, the backplane controller validation board 120 sends verification progress report for function FN of the drive DN to the host computer 110 during the verification process.

At operation 580-04, the backplane controller validation board 120 sends verification results report for function FN of the drive DN to the host computer 110.

At operation 580-05, the host computer 110 checks if all functions of the drive DN are verified. If all functions of the drive DN are verified, the process continues to operation 580-07. Otherwise, the function number FN is incremented in operation 580-06 and returns to the operation 580-02.

At operation 580-07, the host computer 110 checks if all functions of the drive DN are verified. If all functions of the drive DN are verified, the process continues to operation 580-07. Otherwise, the function number FN is incremented in operation 580-06 and returns to the operation 580-02.

The foregoing description of the exemplary embodiments of the present disclosure has been presented only for the purposes of illustration and description and is not intended to be exhaustive or to limit the present disclosure to the precise forms disclosed. Many modifications and variations are possible in light of the above teaching.

The embodiments were chosen and described in order to explain the principles of the present disclosure and their practical application so as to enable others skilled in the art to utilize the present disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

The invention claimed is:

1. A system for validating functionalities of a backplane controller chip without using an actual backplane, comprising:
   a backplane controller chip validation board having
      a first chip having a first universal serial bus (USB) interface, a first memory, and a backplane controller interface;
      a plurality of backplane controller chip sockets for installing a plurality of backplane controller chips having backplane controller chip firmwares; and
      a backplane simulator comprising a communication interface configured to simulate functions of drives, light-emitting diodes (LEDs) and devices of a backplane such that the drives, the LEDs and the devices of the backplane and the backplane are not needed, wherein the backplane simulator changes operation states of the drives, the LEDs and the devices of the backplane; the first chip and the backplane simulator are wholly separate and distinct hardware elements and communicate with the plurality of backplane controller chips through the backplane controller interface and the communication interface, respectively; the first chip communicates with the backplane simulator indirectly through the plurality of backplane controller chips; at least two of the plurality of the backplane controller chips are in parallel to connect with the first chip and the backplane simulator and the first chip, the at least two of the plurality of the backplane controller chips and the backplane simulator are sequentially connected to each other; and
   the first chip is configured to:
   operate the backplane simulator to simulate the functions of the drives, the light-emitting diodes and the devices of the backplane for validating functions of the backplane controller chip firmwares of the plurality of backplane controller chips;
   receive, from the plurality of backplane controller chips and through the backplane simulator, a signal directed to a specific device of the devices simulated by the backplane simulator;
   generate a response based on the signal; and
   send the response.

2. The system of claim 1, wherein the backplane controller chip validation board is in communication with a host computer having
- a user interface configured for a user to input validating commands and control data for validating the functionalities of the backplane controller chips;
- a backplane controller chip validation software stored in a second memory;
- a second USB interface;
- a USB communication link; and
- a software storage configured to store the backplane controller chip firmwares.

3. The system of claim 2, wherein the backplane controller chip validation board is powered by the USB communication link between the second USB interface of the host computer and the first USB interface of the first chip of the backplane controller chip validation board.

4. The system of claim 3, wherein the first USB interface of the first chip of the backplane controller chip validation board is configured to receive validation commands, control data, and the backplane controller chip firmwares from the host computer, and the first memory of the first chip of the backplane controller chip validation board is configured to store the backplane controller chip firmwares.

5. The system of claim 4, wherein the backplane controller chip validation board is configured to perform:
- receiving validating commands, control data, and the backplane controller chip firmwares from the backplane controller chip validation software of the host computer;
- programming the received backplane controller chip firmwares into the plurality of backplane controller chips;
- validating the functions of the plurality of backplane controller chip with the backplane controller chip firmwares in the plurality of backplane controller chips; and
- sending validation results back to the host computer over the first USB interface of the first chip of the backplane controller chip validation board.

6. The system of claim 5, wherein the validating commands and the control data are configured in accordance with the Small Computer System Interface (SCSI) Enclosure Services (SES) specification to instruct the plurality of backplane controller chips to control the functions of the devices simulated by the backplane simulator on the backplane controller chip validation board.

7. The system of claim 5, wherein the validating commands and the control data are configured in accordance with the Intelligent Platform Management Interface (IPMI) specification to instruct the plurality of backplane controller chips to control the functions of the devices simulated by the backplane simulator on the backplane controller chip validation board.

8. The system of claim 7, wherein the IPMI validating commands comprises a plurality of extended OEM IPMI commands.

9. The system of claim 5, wherein the validating commands and the control data are configured in accordance with the Serial General-Purpose Input/Output (SGPIO) specification to instruct the plurality of backplane controller chips to control the functions of the devices simulated by the backplane simulator on the backplane controller chip validation board.

10. The system of claim 5, wherein one of the received backplane controller chip firmwares is programmed into one of the plurality of backplane controller chips after a backplane controller chip ID, a firmware revision, a checksum and a last page of a received backplane controller chip firmware binary image are verified.

11. The system of claim 10, wherein the received backplane controller chip firmware binary image is programmed into the one of the plurality of backplane controller chips through a programming interface, wherein the programming interface comprises an Inter-Integrated Circuit ($I^2C$) communication link, a Serial General-Purpose Input/Output (SGPIO) communication link and a Small Computer System Interface (SCSI) Enclosure Services (SES) communication link.

12. A computer-implemented method for validating a backplane controller chip without using an actual backplane, comprising:
- connecting a backplane controller chip validation board to a host computer with a universal serial bus (USB) communication link, wherein the backplane controller chip validation board has
  - a first chip having a first USB interface, a first memory, and a backplane controller interface;
  - a plurality of backplane controller chips socket for installing a plurality of backplane controller chips; and
  - a backplane simulator comprising a communication interface configured to simulate functions of drives, light-emitting diodes and devices of a backplane such that the drives, the light-emitting diodes and the devices of the backplane and the backplane are not needed, wherein the backplane simulator changes operation states of the drives, the light-emitting diodes and the devices of the backplane;
- installing the plurality of backplane controller chips to be validated on the plurality of backplane controller chip sockets on the backplane controller chip validation board, wherein the first chip and the backplane simulator are wholly separate and distinct hardware elements and communicate with the plurality of backplane controller chips through the backplane controller interface and the communication interface, respectively; the first chip communicates with the backplane simulator indirectly through the plurality of backplane controller chips; at least two of the plurality of the backplane controller chips are in parallel to connect with the first chip and the backplane simulator; and the first chip, the at least two of the plurality of the backplane controller chips and the backplane simulator are sequentially connected to each other;
- receiving backplane controller chip firmwares from the host computer;
- programming the plurality of backplane controller chips to be validated with the backplane controller chip firmwares from the host computer;
- configuring the backplane simulator to simulate the functions of the drives, the light-emitting diodes and the devices of the backplane for validating functions of the backplane controller chip firmwares of the plurality of backplane controller chips;
- sending validating commands and control data from the host computer to the backplane controller chip validation board to validate the functions of the backplane controller chip firmwares of the plurality of backplane controller chips; and
- sending validation results report from the backplane controller chip validation board to the host computer.

13. The computer-implemented method of claim 12, wherein the host computer further comprises a user interface configured for a user to input validating commands and control data for validating functionalities of a plurality of target backplane controller chips;
a backplane controller chip validation software stored in a second memory;
a second USB interface; and
a software storage configured to store the backplane controller chip firmwares.

14. The computer-implemented method of claim 13, wherein the backplane controller chip validation board is powered by the USB communication link between the second USB interface of the host computer and the first USB interface of the first chip of the backplane controller chip validation board.

15. The computer-implemented method of claim 14, wherein the backplane controller chip validation board is configured to perform:
receiving the validating commands, the control data, and the backplane controller chip firmwares from the backplane controller chip validation software of the host computer;
programming the received backplane controller chip firmwares into the plurality of backplane controller chips;
verifying the backplane controller chip firmwares in the plurality of backplane controller chips;
sending the received validating commands to the plurality of backplane controller chips;
validating the functions of the backplane controller chip firmwares of the plurality of backplane controller chips; and
sending validation results back to the host computer over the first USB interface of the first chip of the backplane controller chip validation board.

16. The computer-implemented method of claim 15, wherein the validating commands and the control data are configured in accordance with the Small Computer System Interface (SCSI) Enclosure Services (SES) specification to instruct the plurality of backplane controller chips to control the functions of the devices simulated by the backplane simulator on the backplane controller chip validation board.

17. The computer-implemented method of claim 15, wherein the validating commands and the control data are configured in accordance with the Intelligent Platform Management Interface (IPMI) specification to instruct the plurality of backplane controller chips to control the functions of the devices simulated by the backplane simulator on the backplane controller chip validation board.

18. The computer-implemented method of claim 17, wherein the IPMI validating commands comprises a plurality of extended OEM IPMI commands.

19. The computer-implemented method of claim 15, wherein the validating commands and the control data are configured in accordance with the Serial General-Purpose Input/Output (SGPIO) specification to instruct the plurality of backplane controller chips to control the functions of the devices simulated by the backplane simulator on the backplane controller chip validation board.

20. The computer-implemented method of claim 15, wherein one of the received backplane controller chip firmwares is programmed into one of the plurality of backplane controller chips after a backplane controller chip ID, a firmware revision, a checksum and a last page of a received backplane controller chip firmware binary image are verified.

21. The computer-implemented method of claim 15, wherein each of the functions of the backplane controller chip firmwares of the plurality of backplane controller chips is validated by:
receiving, at the first USB interface of the first chip of the backplane controller chip validation board, the validating commands and the control data for the functionality of the plurality of backplane controller chips from the backplane controller chip validation software of the host computer;
transferring the validating commands and the control data to the plurality of backplane controller chips;
executing the validating commands by the first chip of the backplane controller chip validation board to verify the functions of the backplane controller chip firmwares of the plurality of backplane controller chips;
receiving feedback from the backplane simulator in response to the validating commands;
sending the feedback from the backplane simulator in response to the validating commands by the first chip of the backplane controller chip validation board to the host computer through the first USB interface of the first chip of the backplane controller chip validation board; and
determining whether the function validations of the plurality of backplane controller chips is successful by the host computer.

22. A non-transitory computer storage medium having computer-executable instructions stored thereon which, when executed by a first chip of a backplane controller chip validation board, cause the first chip to perform following operations without using an actual backplane:
establishing communication between the backplane controller chip validation board and a host computer with a universal serial bus (USB) communication link, wherein the backplane controller chip validation board having
a first chip having a USB interface, a first memory, and a backplane controller interface;
a plurality of backplane controller chip socket for installing a plurality of backplane controller chips; and
a backplane simulator comprising a communication interface configured to simulate functions of drives, light-emitting diodes (LEDs) and devices of a backplane such that the drives, the LEDs and the devices of the backplane and the backplane are not needed, wherein the backplane simulator changes the operation states of the drives, the LEDs and the devices of the backplane; the first chip and the backplane simulator are wholly separate and distinct hardware elements and communicate with the plurality of backplane controller chips through the backplane controller interface and the communication interface, respectively; the first chip communicates with the backplane simulator indirectly through the plurality of backplane controller chips; at least two of the plurality of the backplane controller chips are in parallel to connect with the first chip and the backplane simulator; and the first chip, the at least two of the plurality of the backplane controller chips and the backplane simulator are sequentially connected to each other;
installing the plurality of backplane controller chips to be validated on the plurality of backplane controller chips socket on the backplane controller chip validation board;

receiving backplane controller chip firmwares from the host computer;

programming the plurality of backplane controller chips with the backplane controller chip firmwares from the host computer;

configuring the backplane simulator to simulate the functions for validating functions of the backplane controller chip firmwares of the plurality of backplane controller chips;

sending validating commands and control data from the host computer to the backplane controller chip validation board to validate the functions of the backplane controller chip firmwares of the plurality of backplane controller chips; and sending validation results report from the backplane controller chip validation board to the host computer.

23. The non-transitory computer storage medium of claim 22, wherein the host computer further comprises
a user interface configured for a user to input validating commands and control data for validating functionalities of the plurality of target backplane controller chips;
a backplane controller chip validation software stored in a second memory;
a second USB interface; and
a software storage configured to store backplane controller the chip firmwares.

24. The non-transitory computer storage medium of claim 23, wherein the backplane controller chip validation board is configured to perform:
receiving the validating commands, the control data, and the backplane controller chip firmwares from the backplane controller chip validation software of the host computer;
programming the received backplane controller chip firmwares into the plurality of backplane controller chips;
verifying the backplane controller chip firmwares in the plurality of backplane controller chips;
sending the received validating commands to the plurality of target backplane controller chips;
validating the functions of the backplane controller chip firmwares of the plurality of backplane controller chips; and
sending validation results back to the host computer over the first USB interface of the first chip of the backplane controller chip validation board.

25. The non-transitory computer storage medium of claim 23, wherein each of functions of the backplane controller chip is validated by performing one or more following operations:
receiving, at the first USB interface of the first chip of the backplane controller chip validation board, the validating commands and the control data for the functionality of the plurality of backplane controller chips from the backplane controller chip validation software of the host computer;
transferring the validating commands and the control data to the plurality of backplane controller chips;
executing the validating commands by the first chip of the backplane controller chip validation board to verify the functions of the backplane controller chip firmwares of the plurality of backplane controller chips;
receiving feedback from the backplane simulator in response to the validating commands;
sending the feedback from the backplane simulator in response to the validating commands by the first chip of the backplane controller chip validation board to the host computer through the USB interface of the first chip of the backplane controller chip validation board; and
determining whether the function validations of the plurality of backplane controller chips is successful by the host computer.

* * * * *